US010384182B2

(12) United States Patent
Schmid et al.

(10) Patent No.: US 10,384,182 B2
(45) Date of Patent: Aug. 20, 2019

(54) COLUMN AND PROCESS FOR DISPROPORTIONATION OF CHLOROSILANES INTO MONOSILANE AND TETRACHLOROSILANE AND PLANT FOR PRODUCTION OF MONOSILANE

(71) Applicant: Schmid Silicon Technology GmbH, Freudenstadt (DE)

(72) Inventors: Christian Schmid, Freudenstadt (DE); Jochem Hahn, Rottenburg (DE); Christian Andreas Fuhrmann, Haigerloch-Weildorf (DE)

(73) Assignee: Schmid Silicon Technology GmbH, Freudenstadt (DE)

( * ) Notice: Subject to any disclaimer, the term of this patent is extended or adjusted under 35 U.S.C. 154(b) by 19 days.

(21) Appl. No.: 15/553,193

(22) PCT Filed: Feb. 23, 2016

(86) PCT No.: PCT/EP2016/053800
§ 371 (c)(1),
(2) Date: Aug. 24, 2017

(87) PCT Pub. No.: WO2016/135159
PCT Pub. Date: Sep. 1, 2016

(65) Prior Publication Data
US 2018/0117557 A1    May 3, 2018

(30) Foreign Application Priority Data
Feb. 27, 2015 (DE) .................. 10 2015 203 618

(51) Int. Cl.
*B01J 19/24* (2006.01)
*C01B 3/22* (2006.01)
(Continued)

(52) U.S. Cl.
CPC ............ *B01J 8/0449* (2013.01); *B01D 3/009* (2013.01); *B01D 3/20* (2013.01); *B01J 8/065* (2013.01);
(Continued)

(58) Field of Classification Search
CPC ...... B01J 19/1893; B01J 19/249; B01J 19/24; B01J 8/009; B01J 8/0221; C01B 3/22; C01B 3/501; C07C 253/00
(Continued)

(56) References Cited

U.S. PATENT DOCUMENTS

| 3,968,199 A | 7/1976 | Bakay |
| 4,676,967 A | 6/1987 | Breneman |

(Continued)

FOREIGN PATENT DOCUMENTS

| DE | 25 07 864 A1 | 8/1975 |
| DE | 33 11 650 A1 | 10/1983 |

(Continued)

OTHER PUBLICATIONS

English translation of Russian Office Action dated Aug. 29, 2018, of counterpart Russian Application No. 2017128257.

*Primary Examiner* — Huy Tram Nguyen
(74) *Attorney, Agent, or Firm* — DLA Piper LLP (US)

(57) ABSTRACT

A column includes a column head, a column sump and a tube-shaped column shell disposed therebetween, two or more reaction zones lying above each other which each accommodate a catalyst bed, in which catalyst beds chlorosilanes disproportionate into low-boiling silanes, which form an ascending stream of gas, and also into high-boiling silanes which form a downwardly directed stream of liquid, within the column shell and along the column axis, two or more rectificative separation zones, the reaction zones and the separation zones alternate along the column axis, the (Continued)

separation zones are configured such that the stream of gas and the stream of liquid meet in the separation zones, and the reaction zones are configured such that the downwardly directed stream of liquid is led through the catalyst beds, whereas the upwardly directed stream of gas passes the catalyst beds in spatial separation from the stream of liquid.

13 Claims, 4 Drawing Sheets

(51) Int. Cl.
    *C07C 253/00*     (2006.01)
    *B01J 8/04*     (2006.01)
    *B01D 3/00*     (2006.01)
    *B01D 3/20*     (2006.01)
    *C01B 33/04*     (2006.01)
    *C01B 33/107*     (2006.01)
    *B01J 8/06*     (2006.01)

(52) U.S. Cl.
    CPC .......... *C01B 33/043* (2013.01); *C01B 33/046* (2013.01); *C01B 33/1071* (2013.01); *C01B 33/10773* (2013.01); *C01B 33/10778* (2013.01); *B01J 2208/06* (2013.01); *Y02P 20/127* (2015.11)

(58) Field of Classification Search
    USPC ........................................................ 422/211
    See application file for complete search history.

(56) References Cited

U.S. PATENT DOCUMENTS

| | | |
|---|---|---|
| 6,905,576 B1 | 6/2005 | Block et al. |
| 6,942,844 B2 * | 9/2005 | Muller .................. B01J 8/0453 |
| | | 422/255 |
| 2004/0091412 A1 | 5/2004 | Muller et al. |
| 2005/0035026 A1 * | 2/2005 | Espinoza ................. C10G 7/00 |
| | | 208/108 |
| 2008/0095691 A1 | 4/2008 | Sonnenschein et al. |
| 2012/0183465 A1 | 7/2012 | Petrik et al. |
| 2012/0201728 A1 | 8/2012 | Petrik et al. |

FOREIGN PATENT DOCUMENTS

| | | |
|---|---|---|
| DE | 198 60 146 A1 | 6/2000 |
| DE | 100 17 168 A1 | 10/2001 |
| DE | 10 2004 045 245 A1 | 4/2006 |
| DE | 10 2005 019 732 A1 | 11/2006 |
| DE | 10 2009 037 154 B3 | 12/2010 |
| DE | 10 2009 032 833 A1 | 1/2011 |
| EP | 1 016 439 A1 | 7/2000 |
| RU | 2152902 C2 | 7/2000 |
| RU | 107520 U1 | 8/2011 |
| RU | 2457178 C1 | 7/2012 |

* cited by examiner

COLUMN AND PROCESS FOR DISPROPORTIONATION OF CHLOROSILANES INTO MONOSILANE AND TETRACHLOROSILANE AND PLANT FOR PRODUCTION OF MONOSILANE

TECHNICAL FIELD

This disclosure relates to a column and process for disproportionation of chlorosilanes into monosilane and tetrachlorosilane coupled with simultaneous rectificative separation of the silanes obtained. The disclosure further relates to a plant for production of monosilane with such a column.

BACKGROUND

High-purity silicon for manufacture of semiconductor elements and solar cells is generally manufactured in a multi-step operation proceeding from metallurgical silicon, which generally includes a relatively high proportion of impurities. An example of a possible way to purify metallurgical silicon is to convert it into a trihalosilane such as trichlorosilane ($SiHCl_3$), which is subsequently subjected to thermal decomposition into high-purity silicon. A procedure of this type is, for example, known from DE 29 19 086 A1.

A further development of this process is due to Union Carbide Corp. and described in DE 33 11 650 A1. Trichlorosilane is not immediately decomposed in this process. Instead, it is subjected to a disproportionation reaction yielding monosilane ($SiH_4$) and tetrachlorosilane ($SiCl_4$) as end products. The monosilane obtained is then thermally decomposed in lieu of trichlorosilane. Advantageously, the decomposition products formed are nearly exclusively hydrogen ($H_2$) and metallic silicon. By contrast, the decomposition of trichlorosilane leads to highly corrosive compounds such as hydrogen chloride (HCl).

The disproportionation of chlorosilanes such as trichlorosilane may be catalyzed. Catalysts that have proved to be particularly advantageous include basic catalysts such as, for example, the amine compounds known from DE 25 07 864 A1. These are preferably employed in bound form, as described, for example, in DE 33 11 650 A1. Catalysts bound to solid carriers are simple to separate from liquid or gaseous reaction mixtures. This is why the virtually exclusive use of amine catalysts—either fixed to carriers or embedded in crosslinked polymers—is state of the art in the industrial disproportionation of chlorosilanes.

It is known, inter alia from DE 198 60 146 A1, to perform the disproportionation of trichlorosilane according to the principle of reactive distillation. Reactive distillation combines reaction and distillation, specifically rectificative separation in one column. Trichlorosilane may be disproportionated over a suitable catalyst within that column while at the same time low-boiling products resulting from the disproportionation reaction are removed from the column by distillation, specifically rectification. The yield of a disproportionation reaction carried out in a closed reaction vessel is limited as a chemical equilibrium becomes established. Reactive distillation, in contrast, by ensuring the ongoing removal of low-boiling products, results in a continuous displacement of the equilibrium, enhancing the yield of the disproportionation reaction and the efficiency of the overall operation.

DE 100 17 168 A1 discloses accommodating within one column a plurality of reactive/distillative regions of reaction in an arrangement where they are stacked on top of each other. A condenser arranged between the regions separates a monosilane-containing product mixture from comparatively high-boiling chlorosilanes. That form of process variant is relatively demanding in terms of equipment requirements, but does ensure that comparatively high-lying regions of reaction are not excessively affected by high-boiling chlorosilanes.

DE 10 2009 032 833 A1 discloses a monosilane disproportionation reaction column accommodating two reactive/distillative regions of reaction one on top of the other. The two regions of reaction are operated at different temperatures and also contain solids having different catalytic effects and thermal stabilities in that the solids chosen for the lower region of reaction are of higher thermal stability than contemplated for the upper region of reaction. A column heated via the column sump only can accordingly be operated at comparatively high temperatures since less care and attention has to be devoted to the thermal stability of the catalyst in the lower region of reaction. The rate of disproportionation can be raised in this way.

It could therefore be helpful to improve existing technical solutions for disproportionation of chlorosilanes, specifically trichlorosilane and provide for high energy efficiency and high yields and be realizable in a plant of very simple equipment design.

SUMMARY

We provide a column for continuous disproportionation of chlorosilanes into monosilane and tetrachlorosilane coupled with simultaneous rectificative separation of the silanes obtained including a column head, a column sump and a tube-shaped column shell disposed therebetween, within the column shell and along the column axis, two or more reaction zone lying above each other which each accommodate a catalyst bed, in which catalyst beds chlorosilanes disproportionate into low-boiling silanes, which form an ascending stream of gas within the column, and also into (comparatively) high-boiling silanes which (after condensation) form a downwardly directed stream of liquid with the column, with the column shell and along the column axis, two or more separation zones serving the purpose of rectificative separation, the reaction zones and the separation zones alternate along the column axis, the separation zones are configured such that the stream of gas and the stream of liquid meet in the separation zones, and the reaction zones are configured such that the downwardly directed stream of liquid is led through the catalyst beds, whereas the upwardly directed stream of gas passes the catalyst beds in spatial separation from the stream of liquid.

We also provide a plant for production of monosilane, including the column for continuous disproportionation of chlorosilanes into monosilane and tetrachlorosilane coupled with simultaneous rectificative separation of the silanes obtained including a column head, a column sump and a tube-shaped column shell disposed therebetween, within the column shell and along the column axis, two or more reaction zone lying above each other which each accommodate a catalyst bed, in which catalyst beds chlorosilanes disproportionate into low-boiling silanes, which form an ascending stream of gas within the column, and also into (comparatively) high-boiling silanes which (after condensation) form a downwardly directed stream of liquid with the column, with the column shell and along the column axis, two or more separation zones serving the purpose of rectificative separation, the reaction zones and the separation zones alternate along the column axis, the separation zones are configured such that the stream of gas and the stream of liquid meet in the separation zones, and the reaction zones are configured such that the downwardly directed stream of liquid is led through the catalyst beds, whereas the upwardly directed stream of gas passes the catalyst beds in spatial separation from the stream of liquid, and a condenser downstream of the column and/or a rectification unit downstream of the column.

We further provide a process of disproportioning chlorosilanes into monosilane and tetrachlorosilane coupled with simultaneous rectificative separation of the silanes obtained including carrying the process out in a column in which, along a column axis, reaction zones for the disproportionation reaction and separation zones for the rectificative separation form an alternating arrangement, filling catalyst beds in the reaction zones with a catalyst that catalyzes the disproportionation reaction, disproportionating in the reaction zones, by the catalyst, chlorosilanes into low-boiling silanes which form an ascending steam of gas within the column, and also into (comparatively) high-boiling silanes which (after condensation) form a downwardly directed steam of liquid within the column, and leading the stream of gas and the stream of liquid through the column such that they meet in the separation zones, whereas, in the reaction zones, the stream of liquid is led downwardly through the catalyst beds and the stream of gas passes the catalyst beds upwardly in spatial separation from the stream of liquid.

DETAILED DESCRIPTION

Figure 1:
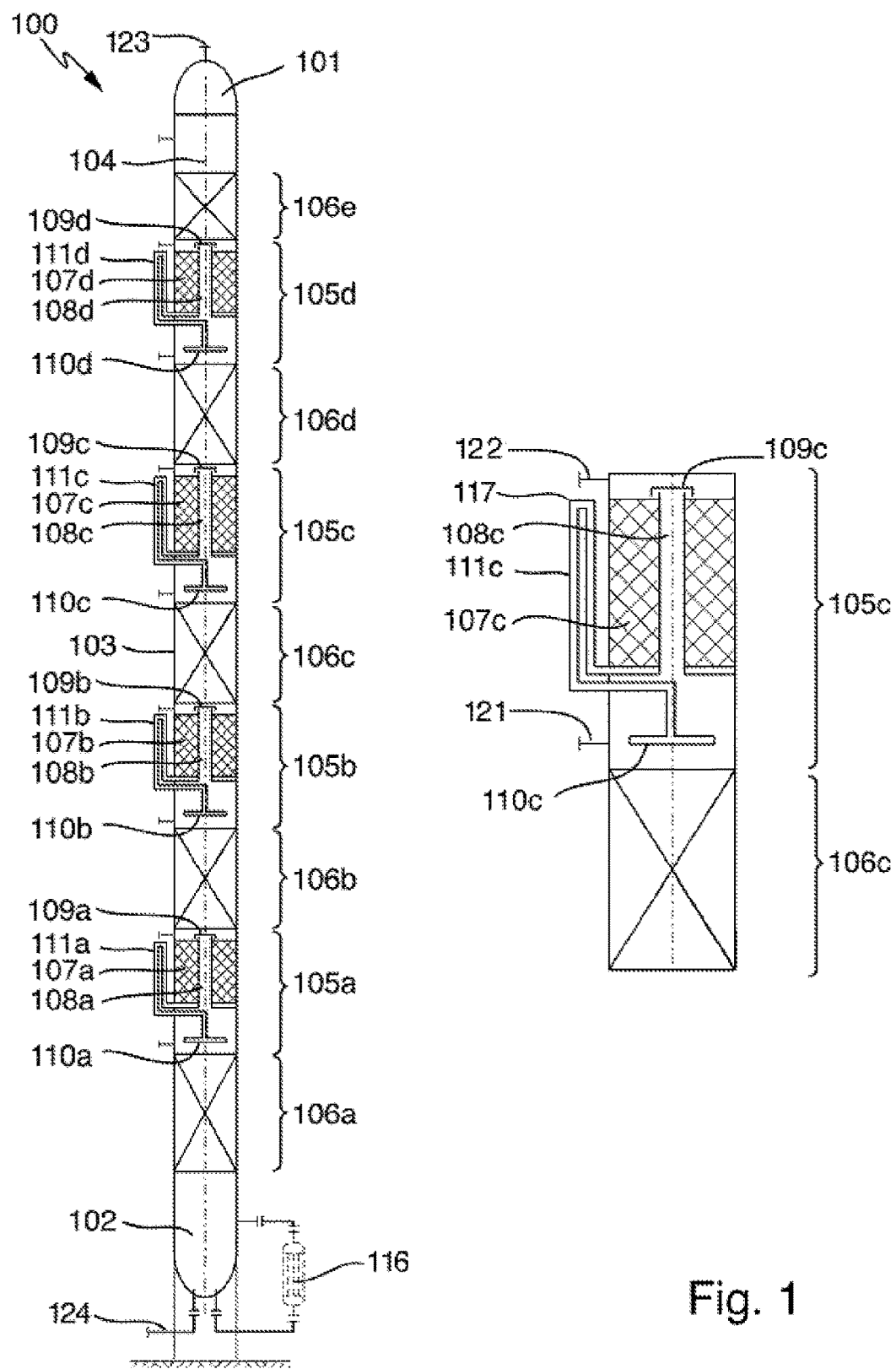
FIG. 1 is a schematic depiction of a preferred example of our column in a longitudinal section.

Our column operates like the columns known from DE 198 60 146 A1, DE 100 17 168 A1 and DE 10 2009 032 833 A1 according to the principle of reactive distillation. Like the columns heretofore used for disproportionation of chlorosilanes, it comprises a column head, a column sump and a tube-shaped column shell disposed therebetween. The column head very generally constitutes the highest point of the column. Column alignment is preferably vertical.

It is very generally operated in a continuous manner. To this end, it may be charged with chlorosilanes in a portionwise manner or in a continuous manner. Removal from the column of monosilane formed in the course of the disproportionation reaction is generally effected in a continuous manner. Product tetrachlorosilane may be removed from the column sump in a continuous manner or at regular intervals.

The preferred starting material for the disproportionation reaction is trichlorosilane, as with the processes described above. Trichlorosilane disproportionates according to the following reaction scheme:

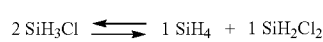
(Equation I)

(Equation II)

(Equation III)

(Equation IV-overall reaction)

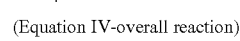

As the scheme shows, the conversion of trichlorosilane into monosilane proceeds via two intermediates, namely via dichlorosilane ($SiH_2Cl_2$) and monochlorosilane ($SiH_3Cl$). The yields in which these intermediate products and the end product, monosilane, are formed depend, as mentioned above, on the particular equilibria established under the conditions prevailing in the column. However, permanent removal of products from the reaction equilibria may be used to shift these equilibria in the desired direction. This is precisely what happens in our column through constant rectificative separation of the silanes and/or silane mixtures obtained.

In principle, mono- and/or dichlorosilane are also employable as starting material for the disproportionation reaction in lieu of trichlorosilane or in combination with trichlorosilane. Especially dichlorosilane is hugely available in manufacturing facilities where silicon is made in the classic manner by thermal decomposition of trichlorosilane. They generate dichlorosilane as a by-product of the decomposition process.

The boiling points of the silanes presenting in the column differ greatly in some instances. The boiling point at atmospheric pressure is $-112°$ C. for monosilane and 57° C. for tetrachlorosilane. The intermediates monochlorosilane and dichlorosilane have boiling points of $-30°$ C. and 8° C. (again at atmospheric pressure). The boiling point of trichlorosilane at atmospheric pressure is 32° C. The large boiling point difference between monosilane and monochlorosilane has a particularly favorable effect in our column: it allows efficient removal of monosilane in the column.

The column shell of our column preferably has the configuration of a hollow cylinder. Within the shell, our column differs quite distinctly from prior art columns heretofore employed for the reactive/distillative conversion of chlorosilanes. The column comprises, within the column shell and along the column axis, a plurality (at least two) of reaction zones lying above each other and also a plurality (at least two) of separation zones for the rectificative separation, wherein the reaction zones and the separation zones alternate along the column axis. In other words, there is always a separation zone between adjacent reaction zones and there is always a reaction zone between adjacent separation zones.

The reaction zones each accommodate a catalyst bed. The chlorosilane disproportionation reaction described takes place therein in accordance with Equations I to III. Each of the equations involves formation of low- and comparatively high-boiling silanes, the terms low-boiling and high-boiling to be understood as having a relative meaning. For instance, the disproportionation of dichlorosilane leads to formation of trichlorosilane and monochlorosilane, where trichlorosilane is the high-boiling component and monochlorosilane is the low-boiling component. The disproportionation of monochlorosilane gives rise to monosilane and dichlorosilane, in which case monosilane is the low-boiling component and dichlorosilane is the high-boiling component.

Having regard to the fact that, viewed statistically, the disproportionation of monochlorosilane in the column takes place "above" the disproportionation of dichlorosilane, it is clear that high-boiling silanes form a downwardly directed stream of liquid within the column, after condensation where appropriate, whereas low-boiling silanes form an ascending stream of gas within the column. Monosilane as the lightest product and tetrachlorosilane as the heaviest product will be drawn in the direction of the column head and of the column sump, respectively.

It is a particularly preferable aspect of our column that the separation zones are configured such that the stream of gas and the stream of liquid meet in the separation zones, while the reaction zones are configured such that the downwardly directed stream of liquid is led through the catalyst beds, whereas the upwardly directed stream of gas passes the catalyst beds in spatial separation from the stream of liquid. In other words, while the stream of gas and the stream of liquid meet in the separation zones, they are led through the reaction zones separately from each other.

The design of our column is superior to conventional designs. Particularly, the combination of an alternating arrangement for the reaction and separation zones with the precise separation of streams of gas and liquid in the reaction zones endows the column with a distinctly higher level of performance as regards yields and reaction rate. Moreover, the energy requirements of the disproportionation process are lower than the prior art disproportionations. We believe that the disproportionation reaction in our column proceeds more efficiently because the contacting of the chlorosilane reactants with the catalyst is not hindered by ascending gas. In addition, the rectificative separation appears to proceed more efficiently by virtue of the alternating arrangement of separation and reaction zones.

Preferably, our column comprises between 2 and 12 reaction zones, more preferably between 4 and 7 reaction zones and specifically 5 reaction zones within the column shell and along the column axis. The uppermost reaction zone is preferably arranged between two separation zones, one above the reaction zone and one below.

Preferably, our column further comprises between 3 and 13 separation zones, more preferably between 4 and 8 separation zones and specifically 6 separation zones within the column shell and along the column axis.

Preferably, the reaction zones each include one or more than one gas duct, preferably a tube-shaped gas duct, wherethrough the stream of gas is able to pass (upwardly) the catalyst bed in the reaction zones without hindrance. The gas duct has an inlet and an outlet for ascending gas at its lower end and at its upper end, respectively. A barrier may be used to prevent liquid flowing downwardly from a separation zone above the duct into the outlet provided for the ascending stream of gas.

Particularly preferably, the gas duct is a tube whose axis coincides with the column axis. However, two or more tubes arranged around the column axis may also be provided in addition or alternatively.

Preferably, a gas distributor for the gas flowing upwardly through the gas duct is arranged above the outlet to maximize the cross section of the flow coming into contact with a separation zone above the reaction zone. This gas distributor may also perform the function of the barrier mentioned.

The catalyst beds in the reaction zones are preferably in a ring-shaped arrangement around the column axis, in particular in a ring-shaped arrangement around the tube-shaped gas ducts. In the ideal case, they completely fill up the space between the tube-shaped gas ducts and the column shell. When two or more tubes are provided in an arrangement around the column axis, the catalyst beds preferably extend across the full cross section of the column, merely interrupted by the tubes led through the catalyst beds.

The catalyst beds are at least partly filled with a catalyst promoting the disproportionation reaction taking place there. Regarding catalyst type and composition, the above mentioned prior art may be referenced.

Preferably, our column comprises means whereby the stream of liquid led through the catalyst beds is dammable in a controlled manner. This is of importance in that the catalyst arranged in the catalyst beds is ideally always surrounded by a liquid mixture of silane(s).

Liquid dammed in the catalyst bed can be transferred into the separation zone underneath in various ways. In the simplest case, drainpipes may be arranged in the trays of the catalyst beds, wherethrough liquid can drain into the lower separation zone. In these cases, however, precautions should be taken to ensure that gas flowing upwardly out of the separation zones cannot get into the drainpipes. To this end, the drainpipes may have a syphon-type configuration, for example.

More preferably, a column comprises at least for every reaction zone above a separation zone a tubeline via which dammed liquid from the catalyst bed of this reaction zone is transferable into the separation zone underneath.

This tubeline may run inside and outside the column shell, although it is preferable in many cases for at least a partial section of this tubeline, optionally even the entire tubeline, to be outside the column shell.

Preferably, the tubeline connects to a drainpipe in the tray region of the catalyst bed and is fed with the dammed liquid via same. The drainpipe need not necessarily be arranged in the tray region. However, given that a vertical flow through the catalyst bed is regarded as advantageous, the arrangement of the drainpipe in the tray region is preferable. It is further supposed that low boilers forming in the course of the disproportionation reaction will collect in the tray region of the catalyst bed. Precisely they are supposed to be conveyed downwardly within the column.

Particularly preferably, the tubeline initially goes up in the direction of the column head only to change direction, in particular describe an arc in the shape of an inverted "U," and descend in the direction of the separation zone (and hence also in the direction of the column sump) underneath. Together with the catalyst bed having the drainpipe in the tray region, a tubeline configured thus forms a syphon-type arrangement. Preferably, in this arrangement, the lowest point of the syphon and its outlet are formed by the tray of the catalyst bed and by the arc, respectively.

The liquid level within the catalyst bed is controllable via the height of the arc. Hence the tubeline and the syphon-type arrangement constitute a preferred example of the aforementioned means to control damming of the stream of liquid in the catalyst beds.

Particularly preferably, the tubeline communicates via a connecting line with the column interior above the catalyst bed and is fed therefrom with liquid, in particular with the column interior immediately above the catalyst bed whereinto the tube-shaped gas duct wherethrough the stream of gas can pass the catalyst bed ends (the gas space). Pressure may be equalized if necessary via this connecting line to prevent the catalyst bed being syphoned empty. It is particularly preferable for the connecting line to branch away from the upper end of the arc, specifically in a perpendicularly upward direction.

Preferably, our column comprises at least for each separation zone underneath a reaction zone a distributor for the downwardly directed stream of liquid (a liquid distributor)

to maximize the cross section of the flow coming into contact with these separation zones. These distributors are preferably arranged immediately above the separation zones. Liquid distributors for columns are known. Customary distributors have a central channel whereinto the liquid to be distributed is fed and whereonto in turn a multiplicity of smaller distributor channels usually extending transversely to the central channel are attached. These distributor channels have exit orifices whence the liquid to be distributed can exit dropwise.

In preferred examples, the liquid distributor is in communication, via the tubeline described, with the catalyst bed of the reaction zone arranged thereabove. The liquid distributor is thus preferably fed with liquid from the catalyst bed of the reaction zone arranged immediately thereabove.

In principle, it is also possible to separate the streams of gas and liquid in the reaction zones by leading the stream of liquid via a drainpipe tube out of the catalyst beds into the separation zones arranged underneath the reaction zones, whereas the stream of gas is led upwardly past the catalyst beds, via one or more tubelines, in spatial separation from the stream of liquid and from the catalyst beds. In some preferred examples, the reaction zones of our column therefore include one or more of the following features:

- They each include at least one discharge line wherethrough the stream of liquid is able to flow from the catalyst beds into separation zones underneath the reaction zones.
- The at least one discharge line is preferably a drainpipe tube, in particular a drainpipe tube whose axis coincides with the column axis.
- The drainpipe tube is ringed by the catalyst bed of the particular reaction zone.
- The drainpipe tube is configured as a double tube having an inner tube, an outer tube and an annular gap defined by the external diameter of the inner tube and the internal diameter of the outer tube, wherein the outer tube is sealed at its upper end while the upper end of the inner tube is open and is in communicating connection with the catalyst bed of the particular reaction zone via the annular gap.
- At least a partial section of the tubelines via which the stream of gas can be led past the catalyst bed of the particular reaction zone into the separation zone arranged above the reaction zone is arranged outside the column shell.

The double tube mentioned also combines with the catalyst bed to form a syphon-type arrangement. Preferably, in this arrangement, the lowest point of the syphon and its outlet are formed by the tray of the catalyst bed and by the upper end of the inner tube, respectively.

Preferably, the separation zones each accommodate internals to intensify the heat and mass transfer between the meeting streams of gas and liquid. These internals preferably comprise structured packings. As will be known, what is concerned here is internals comprising usually thin, corrugated and/or perforated metal plates or metal meshes in a regular arrangement. The structure of the packing is supposed to ensure an optimal transfer between gaseous and liquid phase coupled with minimal resistance to pressure.

Alternatively or additionally to the structured packings, the separation zones of our column may also contain packing elements in the form of a loose dump. Known packing elements include, for example, Raschig rings or packing elements of saddle or spherical shape. A further alternative to structured packings in the separation zones are sieve, bubble cap and valve trays.

The column sump of our column is very generally assigned a heating element. This may be an integral part of the column or take the form of an external heating element, in which latter case it is preferable for chlorosilanes to be transferred from the column sump to the heating element and from the latter back into the column sump by the method of circulation.

Optionally, our column very generally comprises a cooling element disposed within the column head or connected thereto. It may take the form of a condenser, for example.

It may hereby be additionally mentioned for completeness that our column does of course comprise at least an inlet for the chlorosilane or chlorosilane mixture to be disproportionated, at least an outlet for tetrachlorosilane formed in the course of the disproportionation reaction, and at least an outlet, preferably disposed in the region of the column head, for monosilane formed in the course of the disproportionation reaction.

Our monosilane production plant comprises our chlorosilane disproportionation column and also, selectively, a condenser downstream of the column, a rectification unit downstream of the column or a combination of the downstream condenser and the rectification unit.

A condenser may be provided in particular when the head of our column is not assigned a cooling element nor is a cooling element integrated in the column head. It may be advantageous in this case to connect a condenser to the column at the downstream end thereof so that components having higher boiling points than monosilanes may be separated off as efficiently as possible.

Since the purity of the monosilane has a direct effect on the quality of the silicon recovered by decomposing the monosilane, there is a very general preference that the monosilane recovered from the disproportionation reaction be worked up by rectification. The rectification unit mentioned is used for this.

Like our column, our process is used for disproportionation of chlorosilanes into monosilane and tetrachlorosilane coupled with simultaneous rectificative separation of the silanes obtained. Our process is essentially notable for the following features:

- the process is carried out in a column in which, along the column axis, reaction zones for the disproportionation reaction and separation zones for the rectificative separation form an alternating arrangement,
- catalyst beds in the reaction zones are filled with a catalyst that catalyzes the disproportionation reaction,
- in the catalyst bed, by the catalyst, chlorosilanes disproportionate into low-boiling silanes, which form an ascending stream of gas within the column, and also into comparatively high-boiling silanes which form a downwardly directed stream of liquid within the column, and
- the stream of gas and the stream of liquid are led through the column such that they meet in the separation zones, whereas, in the reaction zones, the stream of liquid is led downwardly through the catalyst beds and the stream of gas passes the catalyst beds upwardly in spatial separation from the stream of liquid.

Our column in which our process is carried out is preferably an example of the above-described column.

The column is preferably merely heated via the above-mentioned heating element assigned to the column sump. The temperature in the catalyst beds is preferably adjusted to a value between 10° C. and 200° C., preferably between 20° C. and 150° C., specifically to a value between 30° C. and 120° C. The higher temperature value in each case is preferably attained in whichever is the lowest reaction zone, while the lower temperature value in each case is preferably attained in whichever is the highest reaction zone. The pressure within the column is preferably set to a value between 1 bar and 32 bar, preferably between 1.5 bar (g) and 15 bar (g), in particular to a value between 2 bar (g) and 5 bar (g).

Further features and advantages of this disclosure will become apparent from the hereinbelow described drawings of preferred examples.

FIG. 1 is a schematic depiction of a preferred example of our column in a longitudinal section.

The column 100 comprises a column head 101, a column sump 102 heatable via the heating element 116, and a column shell 103. Within the column shell 103 and along the column axis 104 (depicted by a broken line), altogether four reaction zones 105a to 105d and five separation zones 106a to 106e are disposed one above the other in an alternating arrangement. A detail of column 100, comprising the reaction zone 105c and the separation zone 106c, is depicted in enlarged form.

The separation zones 106a to 106e contain structured packings to optimize the mass and heat transfer between liquid and gaseous phases in the column. In each of the reaction zones 105a to 105d, a ring-shaped catalyst bed 107a to 107d is arranged around a central tube 108a to 108d, which coincides with the column axis 104. The tubes 108a to 108d serve to lead a gas stream upwardly directed within the column past the catalyst beds 107a to 107d in spatial separation. At their upper ends, the tubes 108a to 108d each include an outlet for ascending gas.

Above these outlets, the gas distributors 109a to 109d serve in particular to distribute the ascending gas across the full column cross section as uniformly as possible to maximize the cross section of the flow contacting the separation zones 106b to 106e. Above the separation zones 106a to 106d there are, for the same reason, the distributors 110a to 110d for liquid flowing downwardly within the column.

These liquid distributors 110a to 110d are fed out of the catalyst beds 107a to 107d, in each of which a liquid mixture of silane(s) is dammed. The tray region of the catalyst beds 107a to 107d contains in each case a drainpipe which ends in the pipes 111a to 111d, which are led towards the outside through the column shell 103. Outside the column shell 103, the tubes 111a to 111d each rise perpendicularly upwards in the direction of the column head 101 up to an arc 117 in the shape of an inverted "U," whence they descend perpendicularly downwards. Underneath the reaction zones 105a to 105d but above the aforementioned liquid distributors 110a to 110d, they are led back through the column shell 103 into the column 100 where they feed the liquid distributors 110a to 110d with liquid chlorosilanes.

Chlorosilanes may be fed into the column 100 via dedicated filling stubs (as an example of a feed point for a chlorosilane or chlorosilane mixture to be disproportionated), of which preferably in each case one is arranged above every reaction zone and one above every separation zone. In the enlarged detail featuring the reaction zone 105c and the separation zone 106c, filling stubs are depicted, for example, at 121 and 122.

At the upper end of the column head is an outlet 123 for monosilane formed in the course of the disproportionation reaction. At the bottom of the column sump, there is an outlet 124 for tetrachlorosilane formed in the course of the disproportionation reaction.

Figure 2:
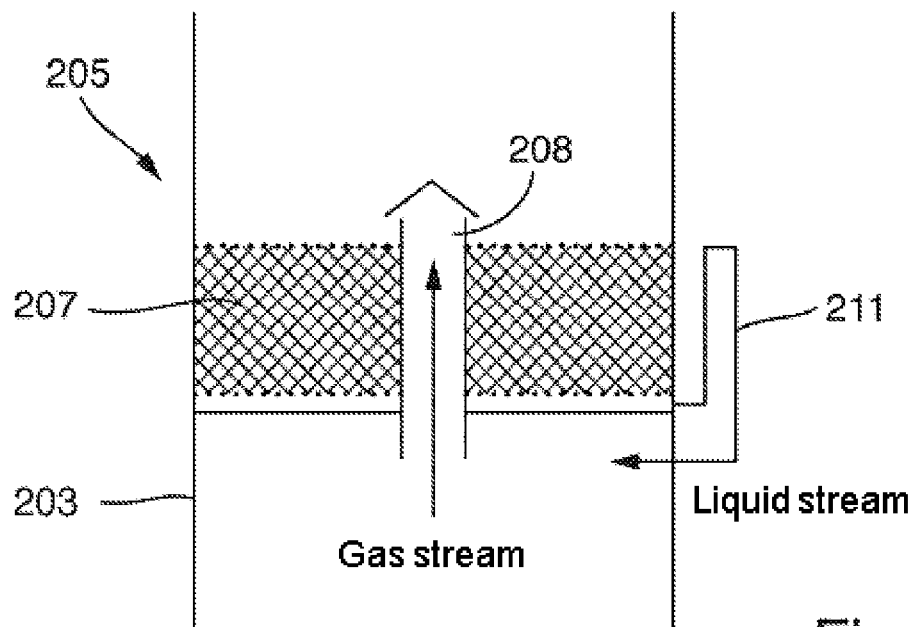
FIG. 2 is a schematic depiction of an example of a reaction zone 205 of our column (longitudinal section) wherein the gas stream within the column is led past a catalyst bed 207 in spatial separation from the stream of liquid.

FIG. 2 is a schematic depiction of an example of a reaction zone 205 of our column (longitudinal section) wherein the gas stream within the column is led past a catalyst bed 207 in spatial separation from the stream of liquid.

For this, the column includes a central tube 208 which is ringed by the catalyst bed 207. The gas stream is led upwardly through the tube 208 past the catalyst bed 207. By contrast, liquid collecting in the catalyst bed 207 is removed from the reaction zone 205 via a tubeline 211 outside the column shell 203. This tubeline 211 passes through the column shell 203 at a point just above the tray of the catalyst bed 207, and then rises upwards, steeply initially, up to an arc in the shape of an inverted "U" and then drops off perpendicularly. Underneath the reaction zone 205, it is led back into the column through the column shell 203.

Figure 3:
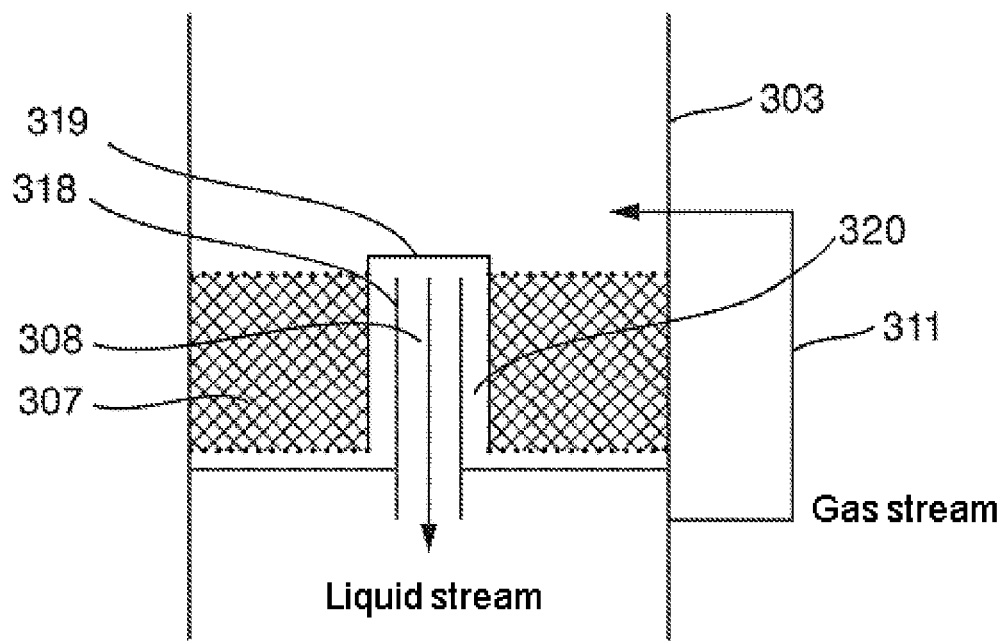
FIG. 3 is a further example of a reaction zone depicted in schematic form (longitudinal section).

FIG. 3 is a further example of a reaction zone depicted in schematic form (longitudinal section). The gas stream is led past the catalyst bed 307 of reaction zone 305 via a tube 311 arranged sectionwise outside the column shell 303. Liquid from the catalyst bed 307, by contrast, is removed downwardly through a drainpipe tube 308 arranged centrally in the column.

The drainpipe tube 308 is configured as a double tube having an inner tube 318, an outer tube 319 and an annular gap 320 defined by the external diameter of the inner tube and the internal diameter of the outer tube, wherein the outer tube 319 is sealed at its upper end while the upper end of the inner tube 318 is open and is in communicating connection with the catalyst bed 307 of the reaction zone 305 via the annular gap 320. As soon as the liquid level in catalyst bed 307 is higher than the point of entry to tube 318, a pressure-equalizing event ensues whereby liquid is forced via the annular gap 320 into the tube 318 and flows away in the downwards direction.

Figure 4:
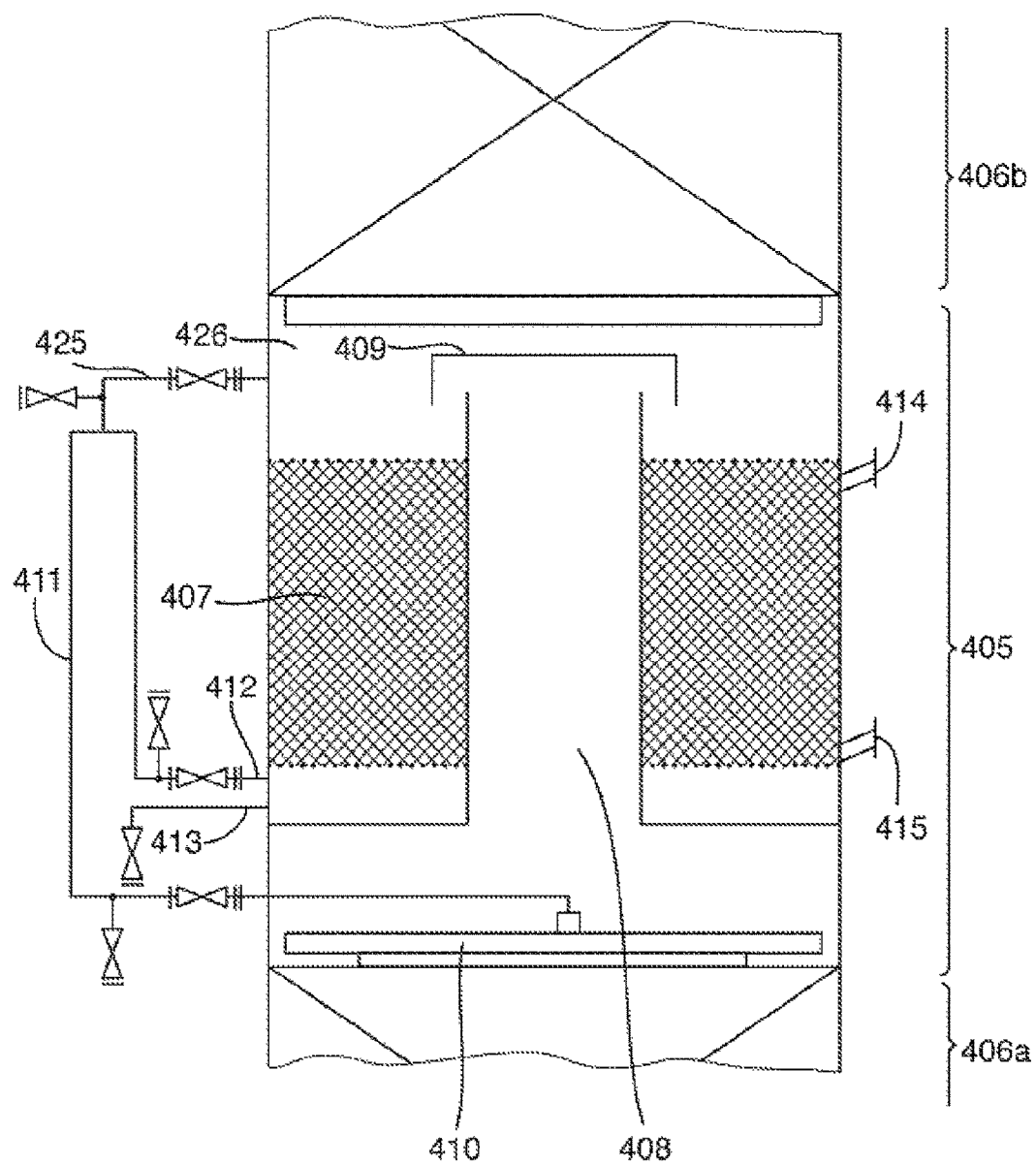
FIG. 4 is a longitudinal section through our column (schematic depiction) depicted in parts.

FIG. 4 is a longitudinal section through our column (schematic depiction) depicted in parts.

What is depicted is the reaction zone 405 and also parts of the separation zones 406a and 406b arranged thereabove and therebelow, respectively. The reaction zone 405 accommodates a ring-shaped catalyst bed 407 arranged around the tube 408. Liquid can be fed into the catalyst bed 407 via the access point 413, but conversely liquid can also be removed from the catalyst bed 407 in the same way. Closable openings are shown at 414 and 415 to fill the catalyst bed 404 with catalyst or remove catalyst from the column.

The purpose of the tube 408 is to lead an upwardly directed stream of gas within the column past the catalyst bed 407 in spatial separation. At its upper end, the tube 408 includes an outlet for ascending gas. Above this outlet is the gas distributor 409 which serves in particular to distribute the ascending gas across the full column cross section as uniformly as possible to maximize the cross section of the flow contacting the separation zone 406b. Above the separation zone 406a is, for the same reason, the distributor 410 for liquid flowing downwards within the column.

The liquid distributor 410 is fed out of the catalyst bed 407 wherein a liquid mixture of silanes is dammed in operation. In the tray region of catalyst bed 407 is a drainpipe tube 412 which leads through the column shell 403, which confines the catalyst bed 407 laterally, and ends directly in tubeline 411. This is led initially perpendicularly upwards in the direction of a column head (not visible here), but then describes an arc in the shape of an inverted "U," whence it descends perpendicularly downwards. Below the reaction zones 405 but above the aforementioned liquid distributor 410, the tubeline 411 is led through the column shell 403 into the column and supplies the liquid distributor 410 with liquid chlorosilanes.

At the upper end of the arc, a connecting line 425 branches away and can be used to connect the tubeline 411 to the gas space 426 above the catalyst bed 407. Pressure may be equalized if necessary via this connecting line 425 to prevent the catalyst bed 407 being syphoned empty.

Figure 5:
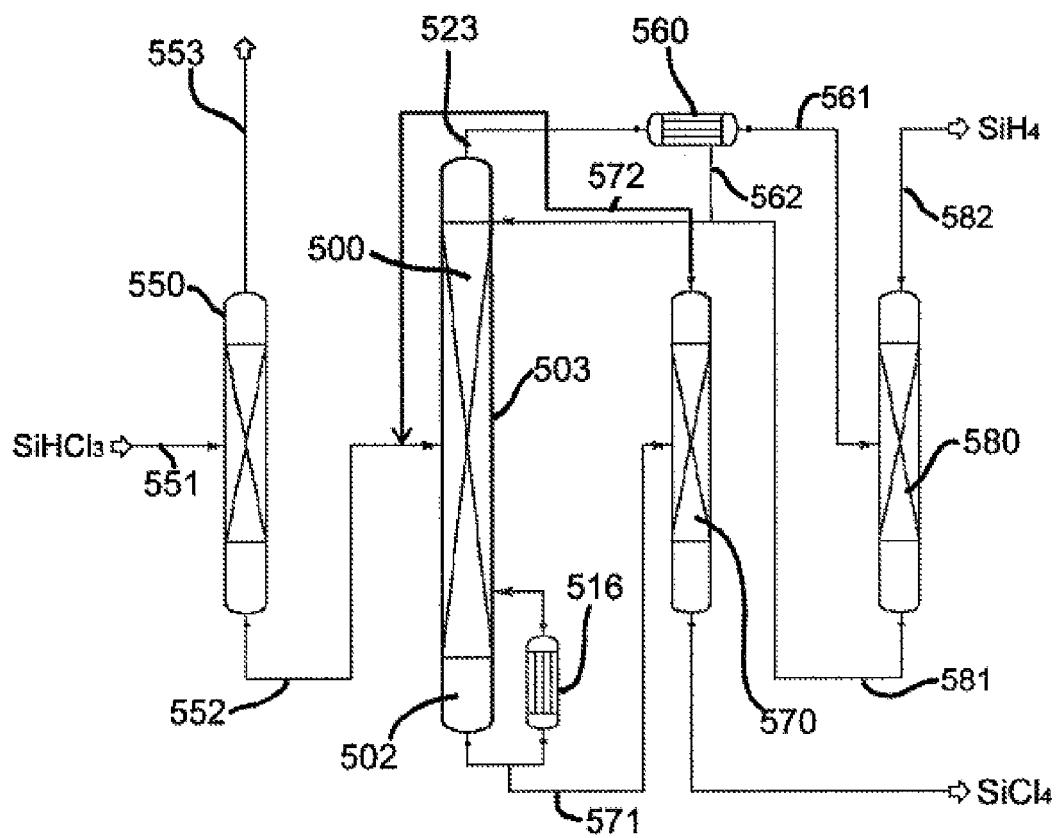
FIG. 5 depicts a flow diagram for an example of our plant.

FIG. 5 depicts a flow diagram for an example of our plant. This comprises a column 500 for disproportionation of chlorosilanes, for example, like the column depicted in FIG. 1. The column 500 is supplied via line 552 with trichlorosilane purified in an upstream step in the distillation or rectification plant 550. The plant 550 is supplied with trichlorosilane via line 551. Trichlorosilane is obtained in the column sump, whereas low-boiling impurities are exported via the line 553.

The column 500 includes a column shell 503 within which a plurality of reaction and separation zones form an alternating arrangement. The column sump 502 is heated indirectly via the heating element 516. To this end, liquid is recirculated with a pump from the column sump into the heating element and back into the column sump. Very generally, a mixture of tetrachlorosilane and trichlorosilane is formed in the column sump. At regular intervals or continuously, some of this mixture is transferred via line 571 into the distillation or rectification plant 570. This is where a separation of silicon tetrachloride and trichlorosilane is effected. Silicon tetrachloride generated is removed from the column sump. Trichlorosilane, by contrast, is fed back into the disproportionation column 500 via the line 572.

Monosilane-containing reaction mixture formed in the column 500 is removed from the column head via the line 523. A first removal of entrained chlorosilanes is effected by the condenser 560. Any recycling of removed chlorosilanes into the column 500 can be effected via the line 562. Further purification can be effected in the distillation or rectification plant 580, which connects to the condenser 560 via the line 561. A separation of monosilane and entrained chlorosilanes is effected in the plant 580. Monosilane is removed from the column head via the line 582. Removed chlorosilanes can be returned into the column 550 via the line 581 for the purpose of further disproportionation.

The invention claimed is:

1. A column for continuous disproportionation of chlorosilanes into monosilane and tetrachlorosilane coupled with simultaneous rectificative separation of the silanes obtained comprising:
   a column head, a column sump and a tube-shaped column shell disposed therebetween,
   within the column shell and along the column axis, two or more reaction zones lying above each other which each accommodate a catalyst bed, in which catalyst beds chlorosilanes disproportionate into low-boiling silanes, which form an ascending stream of gas within the column, and also into (comparatively) high-boiling silanes which (after condensation) form a downwardly directed stream of liquid within the column,
   within the column shell and along the column axis, two or more separation zones serving the purpose of rectificative separation,
   the reaction zones and the separation zones alternate along the column axis,
   the separation zones are configured such that the stream of gas and the stream of liquid meet in the separation zones, and
   the reaction zones are configured such that the downwardly directed stream of liquid is led through the catalyst beds, whereas the upwardly directed stream of gas passes the catalyst beds in spatial separation from the stream of liquid.

2. The column according to claim 1, wherein the reaction zones each include one or more than one gas duct, wherethrough the stream of gas is able to pass (upwardly) the catalyst beds in the reaction zones without hindrance.

3. The column according to claim 2, wherein the gas duct is a tube whose axis coincides with the column axis.

4. The column according to claim 3, wherein the catalyst beds in the reaction zones are in a ring-shaped arrangement around the tube in the reaction zones.

5. The column according to claim 1, further comprises means whereby the stream of liquid led through the catalyst beds is dammable in the catalyst beds in a controlled manner.

6. The column according to claim 1, further comprises, for every reaction zone above a separation zone, a tubeline via which dammed liquid from the Catalyst bed of this reaction zone is transferable into the separation zone underneath, wherein at least a partial section of this tubeline is outside the column shell.

7. The column according to claim 6, wherein the tubeline connects to a drainpipe in a tray region of the catalyst bed and is fed with the liquid via same.

8. The column according to claim 6, wherein the tubeline goes up in the direction of the column head only to describe an arc in the shape of an inverted "U" and descend in the direction of the separation zone underneath.

9. The column according to claim 1, further comprising for each separation zone underneath a reaction zone and a distributor for the downwardly directed stream of liquid (a liquid distributor) to maximize the cross section of the flow coming into contact with these separation zones.

10. The column according to claim 6, wherein the liquid distributor is in communication with the tubeline, at least sections of which are outside the column shell, of a reaction zone arranged thereabove.

11. The column according to claim 1, wherein the two or more reaction zones include one or more of the following features:
   they each include a discharge line wherethrough the stream of liquid is able to flow from the catalyst beds into separation zones underneath the reaction zones;
   the discharge line is a drainpipe tube whose axis coincides with the column axis;
   the drainpipe tube is ringed by the catalyst bed of the particular reaction zone;
   the drainpipe tube is configured as a double tube having an inner tube, an outer tube and an annular gap defined by the external diameter of the inner tube and the internal diameter of the outer tube, wherein the outer tube is sealed at its upper end while the upper end of the inner tube is open and is in communicating connection with the catalyst bed of the particular reaction zone via the annular gap; and
   they each comprise a tubeline via which the stream of gas can be led past the catalyst bed of the particular reaction zone into the separation zone above the reaction zone, wherein at least a partial section of this tubeline is outside the column shell.

12. The column according to claim 1, wherein the separation zones accommodate internals to intensify the heat and mass transfer between the meeting streams of gas and liquid.

13. The column according to claim 1, further comprising one or more of:
- a heating element assigned to the column sump,
- a cooling element disposed within the column head or connected thereto,
- an inlet for a chlorosilane or chlorosilane mixture to be disproportionated,
- an outlet, disposed in the region of the column head for monosilane formed in the course of the disproportionation reaction, and
- an outlet for tetrachlorosilane formed in the course of the disproportionation reaction.

* * * * *